United States Patent [19]
Stanton

[11] Patent Number: 5,917,558
[45] Date of Patent: Jun. 29, 1999

[54] METHOD FOR CONTROLLING A COLOR PROJECTION VIDEO SYSTEM

[75] Inventor: Douglas A. Stanton, Ossining, N.Y.

[73] Assignee: Philips Electronics North America Corp., New York, N.Y.

[21] Appl. No.: 08/916,723

[22] Filed: Aug. 18, 1997

Related U.S. Application Data

[63] Continuation of application No. 08/664,622, Jun. 18, 1996, abandoned, which is a continuation of application No. 08/544,942, Oct. 18, 1995, abandoned, which is a continuation of application No. 08/141,145, Oct. 21, 1993, abandoned.

[51] Int. Cl.$^6$ ..................................................... H04N 9/12
[52] U.S. Cl. .......................................... 348/743; 348/742
[58] Field of Search ........................... 348/739, 742–752, 348/762, 764, 766, 767, 770, 771, 790, 791, 65, 68, 69, 70, 655, 656, 268, 269, 270, 273; 362/293, 299; H04N 9/12, 9/30, 9/31

[56] References Cited

U.S. PATENT DOCUMENTS

| | | | |
|---|---|---|---|
| 4,090,219 | 5/1978 | Ernstoff et al. | 358/59 |
| 4,546,379 | 10/1985 | Sarofeen et al. | 348/269 |
| 4,713,683 | 12/1987 | Fujimori et al. | 348/70 |
| 4,786,146 | 11/1988 | Ledebuhr | 359/49 |
| 4,907,862 | 3/1990 | Suntola | 358/59 |
| 4,929,061 | 5/1990 | Tominaga et al. | 359/49 |
| 4,974,095 | 11/1990 | Arov | 358/231 |
| 5,079,544 | 1/1992 | DeMond et al. | 340/701 |
| 5,282,121 | 1/1994 | Bornhorst et al. | 362/293 |

FOREIGN PATENT DOCUMENTS

| | | | |
|---|---|---|---|
| 0261896 | 3/1988 | European Pat. Off. | |
| 0391529 | 10/1990 | European Pat. Off. | |
| 0615146 | 9/1994 | European Pat. Off. | |
| 0192727 | 8/1987 | Japan | 359/48 |
| 0250425 | 10/1987 | Japan | 358/60 |
| 0179913 | 7/1989 | Japan | 359/48 |

*Primary Examiner*—Michael Lee
*Attorney, Agent, or Firm*—F. Brice Faller

[57] ABSTRACT

A color control system for projection television displays having a projection lamp, a light valve and a device for varying the color of the light from the projection lamp, such as a color wheel. The color wheel driver provides an output signal which represents the position, that is the color, of the color wheel disposed in the lamp beam. The lamp driver varies the output power used to drive the lamp in response to the particular color of the color wheel disposed in the beam. If the projection lamp has a deficiency in a certain color the present system provides greater output power to the projection lamp during the presence of the filter for that color. A user input control provides for changing the tint of the system based on user preferences and/or any changes occurring in the color filters or projection lamp.

23 Claims, 3 Drawing Sheets

METHOD FOR CONTROLLING A COLOR PROJECTION VIDEO SYSTEM

This is a continuation of application Ser. No. 08/664,622, filed on Jun. 18, 1996, abandoned which is a continuation of Ser. No. 08/544,942, filed Oct. 18, 1995, abandoned which is a continuation of Ser. No. 08/141,145, filed Oct. 21, 1993 abandoned.

BACKGROUND AND SUMMARY OF THE INVENTION

This invention relates to projection television systems and specifically to color projection television systems utilizing a single light valve and a device, such as a color wheel, for altering the color of the light emitted by a projection lamp before it impinges on the light valve.

Most commercially available projection video systems utilize separate projection systems for each of the three primary colors. Thus the system require red, green and blue light valves and optical systems which must be accurately converged on the screen. Recently, projection television systems utilizing only a single light valve have been developed. One such system is a color field sequential system, in which the normal video field, 1/60th of a second (16 ms), is broken into three parts, or color fields. These parts are normally equal length, so each color sub-field is 1/180th of a second (5.33 ms). Note that a 1/60 of a second video field is for 60 Hz NTSC systems, 50 Hz non-NTSC system would have a 1/50 of a second (20 ms) video field.

During the three color sub-fields, the light valve is illuminated with red, green and blue light sequentially. While the light valve is illuminated with any given color, the video data corresponding to that color is displayed on the light valve. The eye then fuses the three color sub-fields into a single, full color field. The eye also fuses successive video fields and frames into full motion, full color video. This system requires a device for illuminating the surface of the light valve with the three colors. The simplest of such devices is a rotatable color wheel which serves to change the color of a white projection lamp as it rotates.

Recently, improved light valves particularly suitable for use in projection television systems have become available. One such device is a so-called deformable mirror device (sometimes called a digital mirror device) which is illustrated in U.S. Pat. No. 5,079,544 (the disclosure of which is hereby incorporated by reference as if fully set forth herein) and patents referenced therein, in which the light valve consists of a array of tiny movable mirror-like devices for deflecting a beam of light either to the display screen (on) or away from the display optics (off). By rapidly switching the pixels on and off a grey scale is generated. The pixel array of such a device is quite small in physical size when compared to a comparable liquid crystal display cell. This device requires that all of the light of the projection lamp be focussed on its relatively small surface which can limit the types of projection lamps useable in such a system. However, many otherwise suitable lamps may be deficient in color spectrum. Such lamps may also shift in color temperature as they age. The present system is directed to providing an electronic means for compensating for any color deficiencies in the projection system.

The color wheels for altering the color of the projection lamp are generally manufactured from dichroic filters. These filters suffer from certain drawbacks. The manufacture of dichroic filters is a batch process and there is a sample-to-sample variation in the colorimetry of these filters. Additionally, upon exposure to the intense light of the projection lamp the colors of the dichroic filters will fade. The present device and projection system also provides a means for compensating for batch-to-batch and color shift of dichroic filter wheels. Finally, the device provides a means for adjusting color balance (tint) to user preference.

The present device provides a color control system for projection television displays. The system includes a projection lamp, a light valve and means for varying the color of the light from the projection lamp, typically a color wheel. The color wheel driver provides an output signal which represents the position, that is the color, of the color wheel to a lamp driver. The lamp driver is capable of varying the output power used to drive the lamp in response to the particular color of the color wheel presently in use. For example, if the projection lamp has a deficiency in a certain color the present system provides a larger output power to the projection lamp during the presence of the filter for that color. A user input control provides for changing the color balance of the system based on user preferences and/or any changes occurring in the dichroic filters or projection lamp. A closed loop technique may be used in which a detector senses the emitted color and automatically adjusts color balance.

The disclosure of U.S. Pat. No. 5,079,544 makes reference to the use of a varying neutral density filter to vary the output power of the projection lamp during the course of the addressing of a single pixel. There is no disclosure of the varying of the output power to the projection lamp for color. Thus, U.S. Pat. No. 5,079,544 varies the output of the lamp on the order of microseconds while the present device operates on the order of milliseconds.

BRIEF DESCRIPTION OF THE DRAWINGS

For better understanding of the invention reference is made to the detailed specification to follow which is to be taken in conjunction with the following reference figures.

DETAILED DESCRIPTION OF THE PREFERRED EMBODIMENTS

Figure 1:
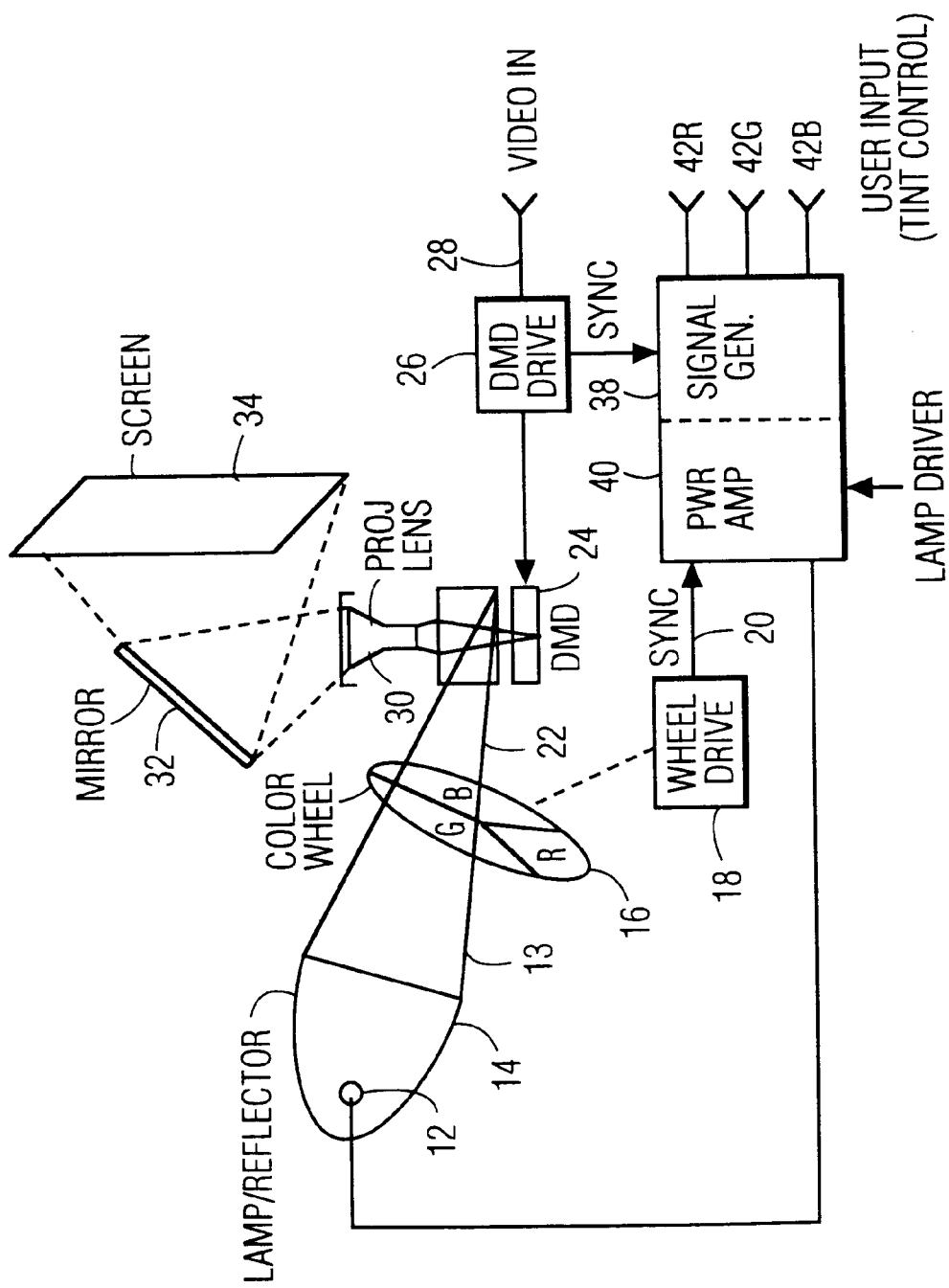
FIG. 1 is a schematic diagram of the improved color control system for a color projection television system.

FIG. 1 illustrates the color control system 10 for a color video projection system which includes a lamp 12 whose light output 13 is directed by a reflector 14 to a color wheel 16. Color wheel 16 comprises three 120° segments of dichroic filters of different colors, in this case red, green and blue. Color wheel 16 is mounted for rotation about its axis and is driven by a wheel drive system 18 which includes an output 20 which represents the position of color wheel 16 and thus the particular color that is positioned in the output path of lamp 12. Thus, output beam 22 is sequentially red, green and blue. Output beam 22 is directed to the surface of a light valve 24, which in this example is a deformable mirror device. The incoming beam 22 of colored light is modulated in accordance with the video information supplied to light valve 24 by a light valve drive 26 which receives its video information from a video input 28. The modulated beam of colored light reflected from the surface of light valve 24 is focused by a projection lens 30 onto a mirror 32 and reflected to a viewing screen 34. In operation, each color is sequentially projected onto the light valve, modulated by light valve 24 with the particular video information for that color and projected on screen 34. The sequence of color images occurs so rapidly that the eye integrates the separate images into a full color picture.

The present lamp driver system permits compensation for any color deficiency in lamp 12 as well as for adjustment to compensate for variations in the color of the dichroic filters used in color wheel 16. As will be discussed in detailed below. The lamp driver system provides that the average power to the lamp remains constant and that the power in the positive pulses to the lamp equals the power in the negative pulses. This prevents lamp life deterioration due to the color compensating drive scheme.

Many different configurations for providing current output to drive lamp 12 are possible. FIG. 1 shows one configuration utilizing a voltage output square wave generator coupled to a current amplifier whose current output follows the voltage input. FIG. 1 shows lamp driver system 36 as comprising a signal generator 38 which is capable of providing voltage waveforms which are used to drive a current (power) amplifier 40 which supplies output power to lamp 12. An input to signal generator 38 is the control signal 20 of wheel drive 18 which provides synchronization of the position of color wheel 16 (and thus the color segment of color wheel 16 that is positioned in the light beam) with the lamp driver signal. Additionally connected to signal generator 38 are user input controls $42_R$, $42_B$, $42_G$ which permit the user to adjust the relative amount of red, blue and green in the output signal.

FIG. 2 shows various pulse drive modes for lamp 12. In each case the signal is generated by signal generator 38 applied to current amp 40, and the output current supplied by power amp 40 follows the waveform of signal generator 38. Lamp intensity follows current output so that when the current output is higher, the light intensity will be higher. FIG. 2a depicts a standard (non color corrected) output waveform. In FIG. 2a the first positive going pulse is applied to lamp 12 when the red segment of color wheel 16 is disposed in light beam 20. When the output signal 20 of wheel drive 18 indicates that the green segment of color wheel 16 is in position a negative pulse is thereafter generated and when the blue segment is positioned in beam 20 a positive pulse is generated. As is seen in FIG. 2a all of the pulses, both positive and negative, for each color, have equal amplitude. Each video field, comprising red, green and blue pulses is 1/60 second (16 ms) with each color field 1/180 second. In this mode of operation, if lamp 12 is deficient in a certain color the resulting displayed picture will also be deficient in that certain color. Additionally, as long as all of the pulses remain of equal amplitude no electrical lamp adjustment can be made for the color temperature as the system ages.

Figure 2A:
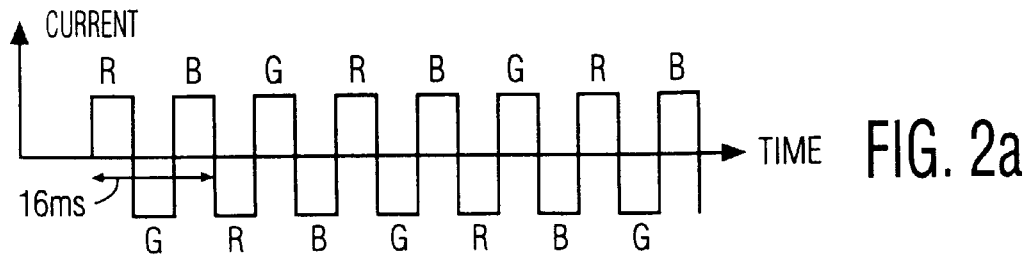
FIGS. 2a–2f are diagrams of the various output waveforms used to provide drive power to the projection lamp in accordance with the invention.
Figure 2B:
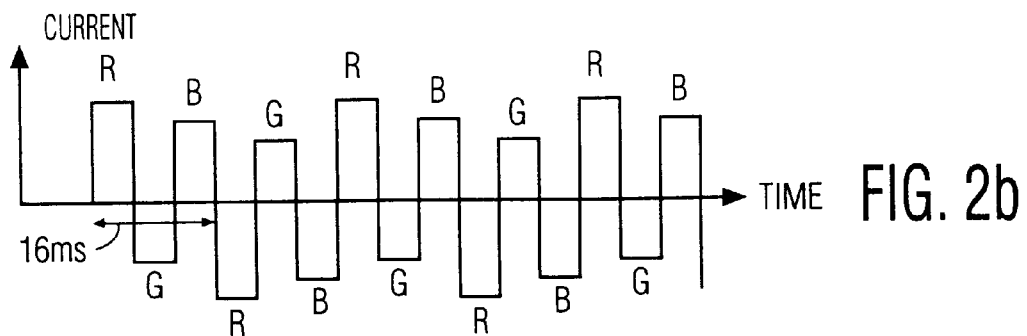
Figure 2C:
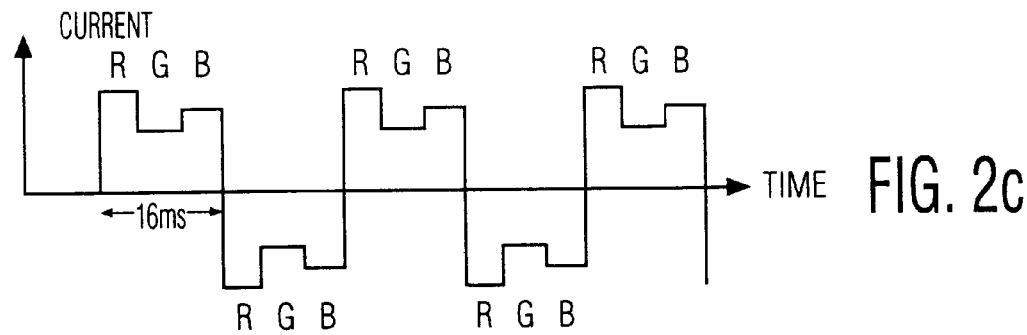
Figure 2D:
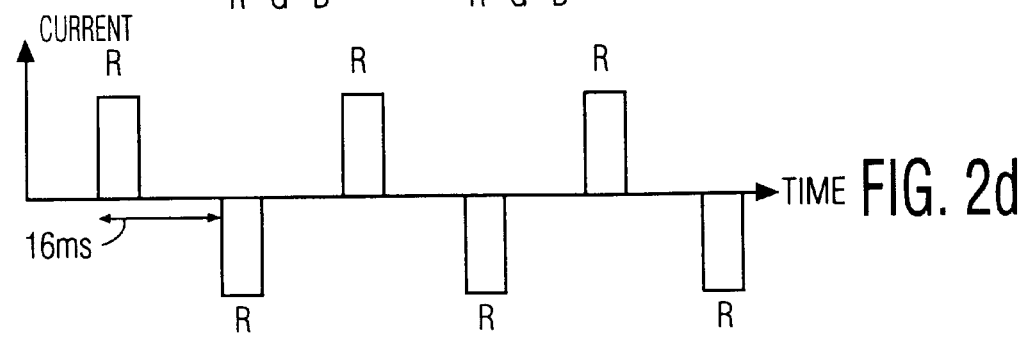

The waveforms shown in FIGS. 2b, 2c and 2d demonstrate the means for compensation of color deficiency as well as for adjustment of the white color temperature. In FIG. 2b a second mode of operation is shown in which the pulses switch polarity after each color field. As is seen the amplitude of the red pulses (both positive and negative) are greater than that of the blue and the blue pulse's amplitude is greater than that of the green. This will compensate for a red deficient lamp (by increasing intensity when the red portion of color wheel 16 is disposed in beam 20) and provide white balance to the output of the display system 10. By means of user input controls $42_R$, $42_G$ and $42_B$ the red, green and blue pulse amplitudes are separately adjustable and are the same for the positive and negative portions of the cycle.

The waveforms shown in FIG. 2c have the same output result of that as shown in FIG. 2b. However, in FIG. 2c each of the three drive pulses to the lamp are of the same polarity and alternate video fields switch polarity. The waveform shown in FIG. 2b and that of FIG. 2c are fully equivalent in terms of their ability to adjust the white color temperature in a system with three primary colors. In a system with a even number of primary colors (i.e. cyan and magenta) the output device must operate in accordance with FIG. 2c in order that the power in the positive pulses equal the power in the negative pulses. It is generally preferable to use the output waveforms as shown in FIG. 2b as these pulses are at a higher frequency (as measured by the zero crossing) than that of FIG. 2c. This prevents a perception of "pulsing" by the viewer.

Figure 2E:
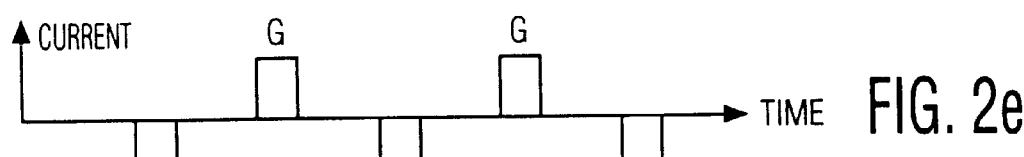
Figure 2F:
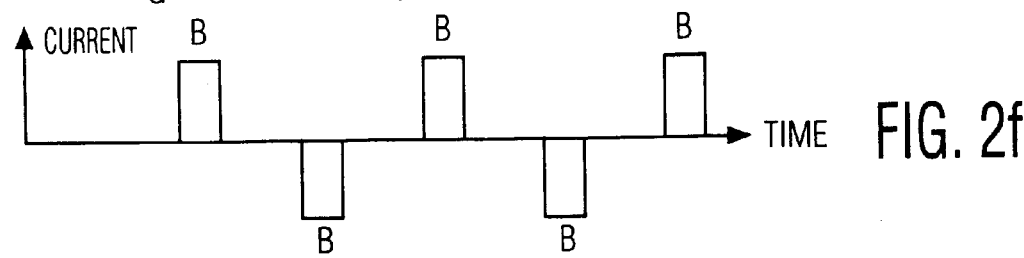

FIGS. 2d, 2e and 2f show the output power for a projection television system in which three separate lamps are used in place of the single lamp 12. In such an arrangement, the single lamp 12 is replaced by three lamps, one for each of the primary colors. However, these systems are subject to the same problems as that of the single lamp system. The lamps may be deficient in a particular color or colors and the filters may vary or fade. In this mode, each lamp receives a series c)f pulses, timed so as to actuate only a single lamp. The pulses are varied in current amplitude so as to vary the color output to provide color correction or to adjust to user preference. As is seen this control scheme permits the output power of the various lamps to be altered so as to provide white balance on the screen.

Figure 3A:
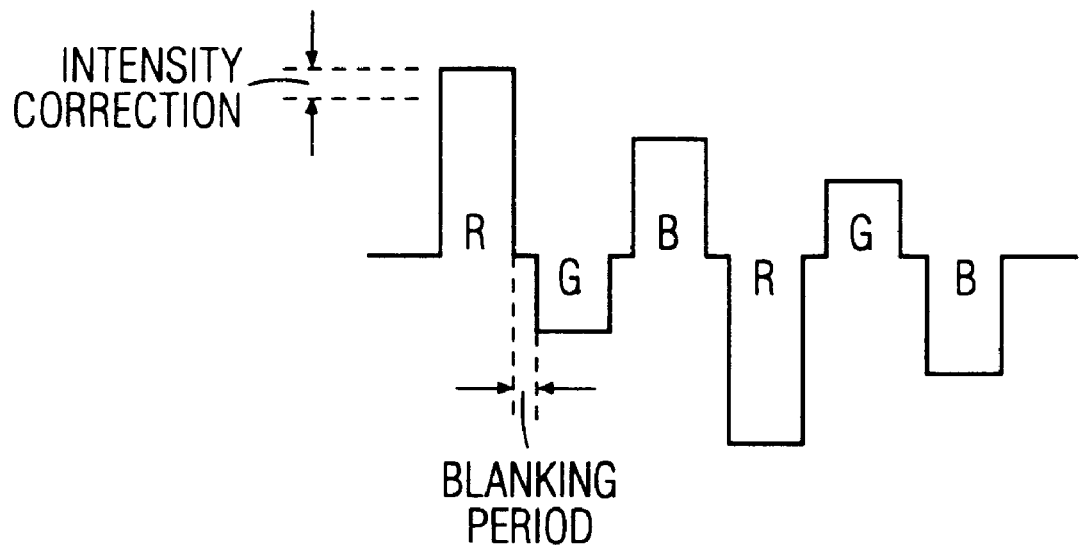
FIGS. 3a and 3b illustrate driving waveforms which include a blanking period with intensity compensation for the off time.
Figure 3B:
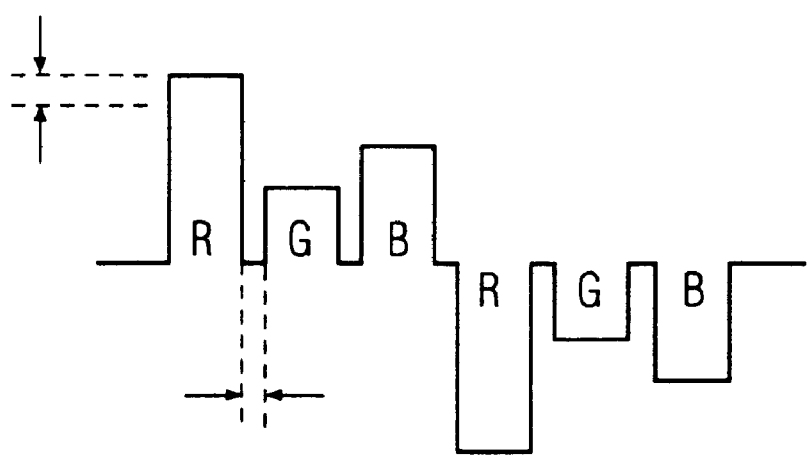

FIGS. 3a and 3b illustrate waveforms which provide a "blanking interval" in the light output of projection lamp 12. When a beam of white light is interrupted by a color wheel, two colors may be illuminated simultaneously or incorrectly alternated. This may be corrected by turning the lamp off during the error period ("blanking period" in FIGS. 3a and 3b) and increasing the intensity of lamp 12 during its on period (increased intensity in FIGS. 3a and 3b) to compensate for the power lost. FIG. 3a illustrates the blanking period waveform with intensity compensation in which there is a zero crossing (+/−) between colors and FIG. 3b illustrates the waveform without a zero crossing until all three colors have been displayed. This blanking period may also be used to "mask" periods when light valve 24 is being loaded with data.

The above-described embodiments are merely illustrative of the principles of the present invention. Numerous modifications and variations thereof will be readily apparent to those skilled in the art without departing from the spirit and scope of the present invention.

What is claimed is:

1. Method for controlling a color projection video system, said method comprising providing a video signal which provides light modulating information for a continuous series of videos fields, each video field comprising a plurality of color subfields, providing light beam generating means for generating a sequence of light beams having different colors simultaneously with modulating information for respective color subfields, driving said lamp means with a sequence of electrical power pulses corresponding to said light beams having different colors, each pulse having an amplitude differing from the amplitude of at least one other pulse in the sequence, whereby the intensity of said light beam for each color differs from the intensity of said light beam for at least one other color, maintaining a constant average electrical power to said lamp means over said continuous series of video fields regardless of the relative amplitudes of the pulses in each sequence, and modulating said light beams in accordance with said video signal by means of a light valve.

2. Method as in claim 1 wherein said light beam generating means comprises a lamp which emits white light, said method comprising altering said white light to sequentially impart a plurality of colors thereto simultaneously with modulating information for respective color subfields, thereby producing said sequence of light beams having different colors.

3. Method as in claim 1 wherein said electrical power pulses are represented by a square wave having an amplitude which is dependent upon the current supplied to the lamp.

4. Method as in claim 3 wherein the pulses in each sequence have the same polarity.

5. Method as in claim 4 wherein the polarity of the square wave switches for each successive video field in the series.

6. Method as in claim 5 wherein each video field consists of three color subfields, whereby each sequence of pulses consists of three pulses having the same polarity.

7. Method as in claim 3 wherein the polarity of the square wave switches for each successive pulse.

8. Method as in claim 3 wherein the power to the lamp is turned off between pulses.

9. Method as in claim 1 wherein said light beam generating means comprises a plurality of lamps and a like plurality of filters which generate said sequence of light beams having different colors, said method comprising driving said lamps sequentially with said sequence of electrical power pulses corresponding to said light beams having different colors.

10. Method as in claim 9 wherein said electrical power pulses are represented by a square wave for each of said lamps, said square waves each having an amplitude which is dependent upon the current supplied to the respective lamp, the pulses for each lamp being separated by a pause which accommodates the pulse for at least one other lamp.

11. Method as in claim 10 wherein the polarity of the square wave for each lamp switches for each successive pulse.

12. Method as in claim 10 wherein each video field consists of three color subfields, whereby each sequence of pulses consists of three pulses for three respective lamps.

13. Method for controlling a color projection video system, said method comprising providing a video signal which provides light modulating information for a continuous series of videos fields, each video field comprising a plurality of color subfields, providing a lamp which emits a beam of white light, altering said white light to sequentially impart a like plurality of colors to said light beam simultaneously with modulating information for respective color subfields, driving said lamp with a sequence of electrical power pulses corresponding to said colors of said light beam, each pulse having an amplitude differing from the amplitude of at least one other pulse in the sequence, whereby the intensity of said lamp for each color differs from the intensity of said lamp for at least one other color, maintaining a constant average electrical power to said lamp over said continuous series of video fields regardless of the relative amplitudes of the pulses in each sequence, and modulating said light beam in accordance with said video signal by means of a light valve.

14. Method as in claim 13 wherein the pulses in each sequence have the same polarity.

15. Method as in claim 13 wherein the polarity of the square wave switches for each successive pulse.

16. Method as in claim 13 wherein the white light is altered by means of a color wheel interposed between the lamp and the light value.

17. Method as in claim 16 wherein said color wheel comprises three 120° segments of dichroic filters for three respective colors.

18. Method as in claim 13 further comprising, after modulating said light beam, projecting said light beam continuously onto a screen, said colors being projected sequentially onto said screen.

19. Method as in claim 1 wherein each pulse has the same duration.

20. Method as in claim 1 further comprising, after modulating said light beams, projecting said light beams having different colors sequentially onto a screen.

21. Method as in claim 1 further comprising providing means for adjusting the relative amplitudes of pulses in a sequence.

22. Method as in claim 1 wherein said means for adjusting the relative amplitudes comprises user input controls for the respective pulses.

23. Method as in claim 1 wherein said means for adjusting the relative amplitudes comprises a detector which senses the color and automatically adjusts the relative amplitudes.

* * * * *